United States Patent [19]

Owen

[11] Patent Number: 4,669,808
[45] Date of Patent: Jun. 2, 1986

[54] ELECTRICAL RECEPTACLE

[75] Inventor: Leonard J. Owen, Oxhey, England

[73] Assignee: AMP Incorporated, Harrisburg, Pa.

[21] Appl. No.: 866,198

[22] PCT Filed: Aug. 30, 1985

[86] PCT No.: PCT/US85/01650
§ 371 Date: May 2, 1986
§ 102(e) Date: May 2, 1986

[87] PCT Pub. No.: WO86/02131
PCT Pub. Date: Apr. 10, 1986

[30] Foreign Application Priority Data
Oct. 4, 1984 [GB] United Kingdom ............... 8425103

[51] Int. Cl.$^4$ ........................................... H01R 13/12
[52] U.S. Cl. .................................................. 439/858
[58] Field of Search ............ 339/217 S, 258 R, 258 P, 339/258 S, 256 SP

[56] References Cited
U.S. PATENT DOCUMENTS 3,192,498  6/1965  Ruehlemann ............... 339/258 R X
3,992,076  11/1976  Gluntz ............................. 339/258 R
4,076,369  2/1978  Ostapovitch ................... 339/258 R
4,453,799  6/1984  Inoue ........................... 339/258 S X
4,472,017  9/1984  Sian ............................ 339/258 S X Primary Examiner—Gil Weidenfeld
Assistant Examiner—Glenn L. Webb
Attorney, Agent, or Firm—T. G. Terrell

[57] ABSTRACT

The receptacle (2), which is especially for mating with a ceramic chip resistor (4), comprises first and second superposed plates (6 and 8) defining a tapered passage (12). The plates are joined by resilient bights (14) on opposite sides of a mouth (10) of the passage (12). The first plate (6) is connected to the bights (14) at positions (P) spaced back from the mouth (10) so that a portion (15) of the first plate (6) projects freely between the bights (14). The resistor (4), when inserted into the passage (12) by way of the mouth (10), tilts the first plate (6) about its connections with the bights (14) so that the resistor (4) is tightly gripped between the plates (6 and 8) when the leading end (37) of the resistor (4) reaches a stop (28) beyond the positions (P) at which the first plate (6) is joined to the bights (14).

9 Claims, 6 Drawing Figures

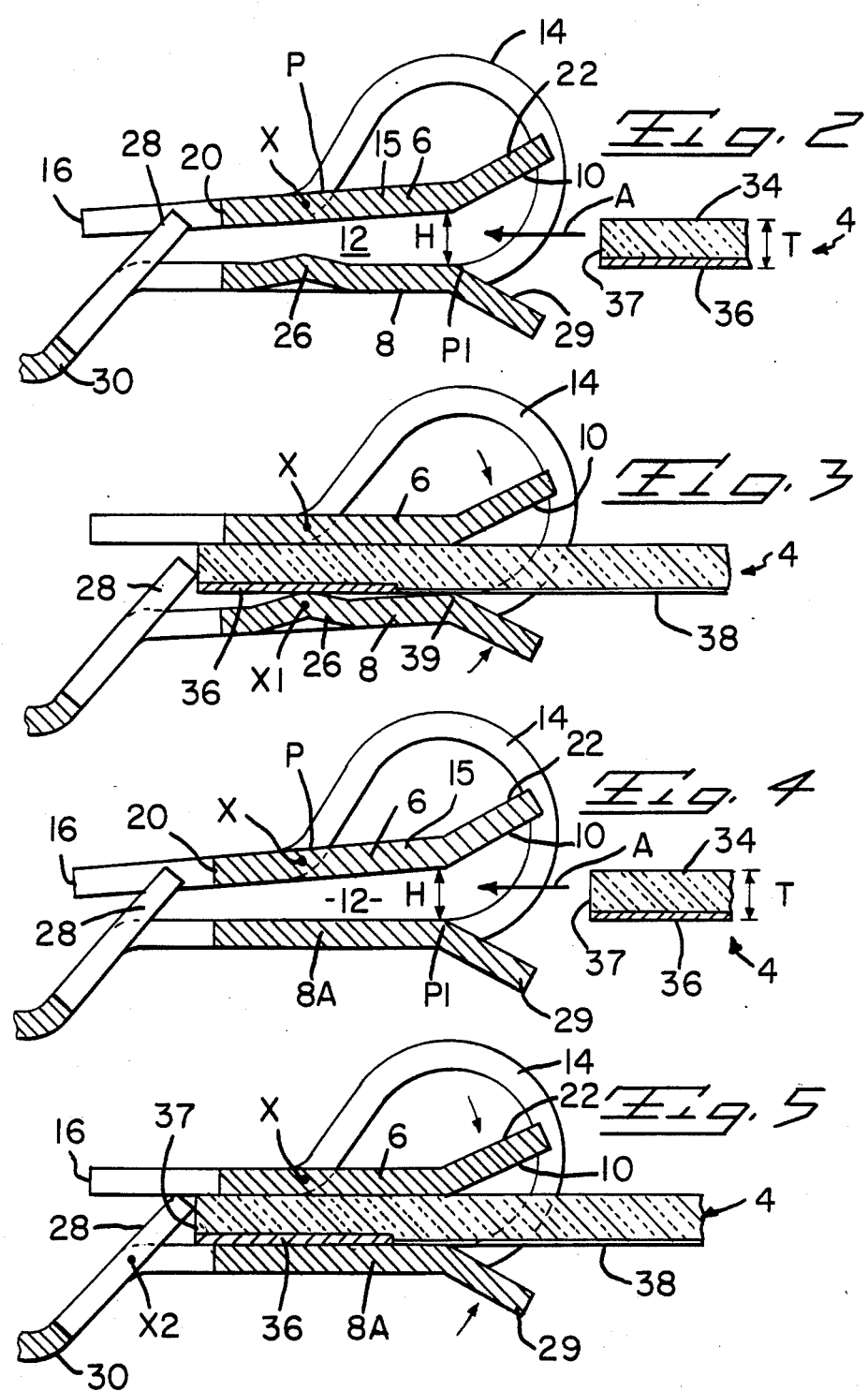

ELECTRICAL RECEPTACLE

This invention relates to an electrical receptacle for mating with a male electrical element, especially, but not exclusively, with a ceramic chip resistor.

A ceramic chip resistor, comprises an elongate rectangular ceramic wafer upon which has been formed a resistive tile connected at each of two opposite ends thereof to a metallic contact pad on a respective end of the wafer. Where, as will usually be the case, the wafer has been severed from a ceramic strip, the ends of the wafer are rectangular, that is to say they are unchamfered.

It is desirable that a receptacle for mating with such a resistor should be arranged to assist in dissipating heat generated by current flowing through the resistive tile when the resistor is in use, and that the receptacle should be suitable for accepting a rectangular wafer end.

In practice, a ceramic chip resistor is supported on a printed circuit panel or other substrate, by means of a pair of receptacles each of which has previously been mated with a respective end of the wafer.

There is disclosed in Japanese Utility Model Publication No. 57-50979 an electrical receptacle for mating with a male electrical element, comprises first and second superposed plates cooperating to define a flared mouth and a passage communicating with the mouth, the plates being joined together by resilient bights on opposite sides of the mouth.

This receptacle mates with a tab having a chamfered leading end.

According to the present invention, the first plate is connected to the bights at positions spaced back from the mouth, and thus projects freely between the bights so as to be tiltable about its connections therewith by a male electrical element inserted into the passage by way of the mouth, to cause the male element to be gripped between the plates at least in the vicinity of the mouth and at a position remote therefrom, when the leading end of the male element has reached a predetermined position beyond said connections.

By virtue of the invention the force required to mate the male element with the receptacle, is initially low and the contact pressure exerted by the plates against the fully inserted male element is desirably high. Where the male element is a ceramic chip resistor, the tendency of the rectangular end of the wafer to inhibit the insertion of the male element and to damage the contact surfaces of the receptacle is thereby reduced, and the resistive tile will be firmly engaged when the resistor has been fully inserted into the passage so that the receptacle assists in the dissipation of heat generated by current flowing through the tile when the resistor is in use.

The contact pressure can readily be controlled by suitably choosing the dimensions and the spring characteristics of the bights.

The insertion depth of the male element can be predetermined by providing a stop projecting into the passageway and which may be in the form of a tongue struck out from one of the plates.

High pressure point or line contact between the plates and the male element, may be achieved by dimpling a plate in the vicinity of its tilting axis so as slightly to constrict the passage.

One of the plates may be extended to provide an anchoring portion, for example, in the form of a sprague nut, for securing the receptacle to a printed circuit board or other subtrate when the resistor has been mated with the receptacle.

For a better understanding of the invention, reference will now be made by way of example to the accompanying drawings in which:

FIG. 2 is a view taken on the lines 2—2 of FIG. 1;

FIG. 3 is a similar view to that of FIG. 2, but showing the male element mated with the receptacle;

FIG. 4 is a similar view to that of FIG. 2, but illustrating a modification of the receptacle shown in FIGS. 1 to 3; and FIG. 5 is a similar view to that of FIG. 4, but showing themale element mated with the receptacle.

Figure 1:
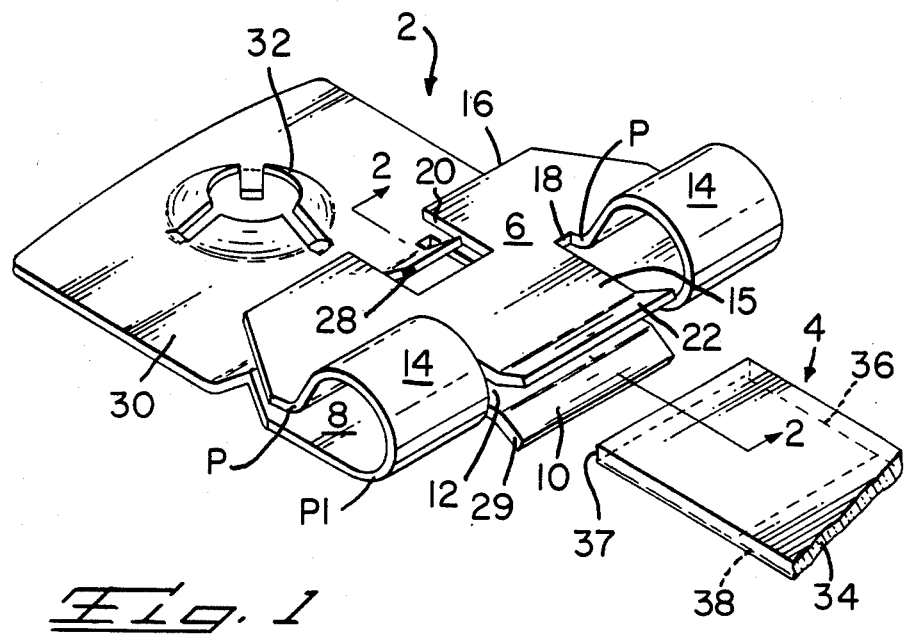
FIG. 1 is a top perspective view of an electrical receptacle showing a male electrical element in the form of a ceramic chip resistor (only one end portion of which is shown) positioned for mating with the receptacle.
Figure 1A:
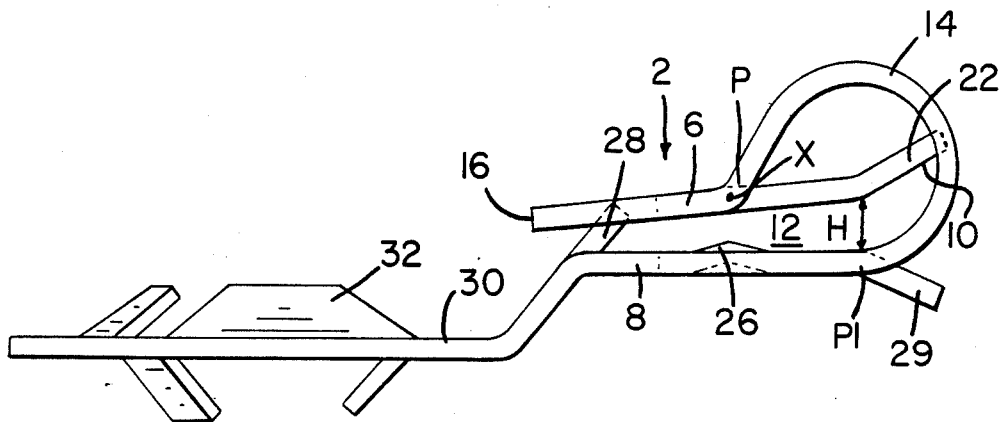
FIG. 1A is a side view of the receptacle.

As shown in FIGS. 1 to 3 an electrical receptacle 2 for mating with a male electrical element 4 in the form of a constant cross-section ceramic chip resistor, which receptacle has been stamped and formed from a single piece of sheet metal stock, comprises a pair of superposed, first and second i.e., upper and lower, plates 6 and 8, respectively, cooperating to define a flared mouth 10 and a passage 12 communicating with the mouth 10. The plates 6 and 8 converge in a direction away from the mouth to so that the passage 12 tapers in height away therefrom, as best seen in FIGS. 1A and 2. The plates 6 and 8 are joined together by axilly aligned, resilient bights 14 on opposite sides of the mouth 10. The upper plate 6 is connected to first ends of the bights 14 at positions P spaced back by a substantial distance from the mouth 10, so that a portion 15 of the plate 6 projects freely between the bights 14.

The first, or upper, plate 6 is in the form of a cantilever having a rearward free edge 16 opposite to an edge 18 from which the bights 14 extend, the edge 18 being formed with a central notch 20. The plate 6 is free to tilt about an axis X, passing through the positions P, against the resilient action of the bights 14. The portion 15 of the plate 6 terminates in a forward part 22 which is inclined in a direction away from the plate 8 to provide one wall of the mouth 10.

The second, or lower plate 8 is formed wht a dimple 26 which is opposite to the axis X and is thus spaced back from the mouth 10 by said substantial distance, the dimple 26 projecting into, and thus serving locally to constrict, the passage 12. The plate 8 is connected to the bights 14 at second ends thereof, at positions P1 which are proximate to the mouth 10. A stop, in the form of a tongue 28 struck out from the plate 8, niormally extends across the passage 12 and projects into the notch 20 in the plate 6. A rear extension plate 30 of the plate 8 is formed wit a sprague nut 32 for use in securing the receptacle 2 to a support, for example a printed circuit board or other substrate. The plate 30 lies beyond the plate 6 in a direction away from the mouth 10.

The male element 4 comprises a ceramic wafer 34, the lower (as seen in FIGS. 1, 2 and 3) surface of each end portion (only one is shown) of which has thereon a metallic pad 36 connected to a resistive tile 38 intermediate the pads 36 and being electrically connected thereto. The ends 37 of the wafer 34 are rectangular, that is to say, they are unchamfered. The thickness T of the element 4 is slightly less than the maximum height H of the passage 12.

For mating the element 4 with the receptacle 2, an end 37 of element 4 is inserted into the passage 12, in the direction of the arrow A in FIG. 2, guided by the mouth 10, until the insertion of the element 4 is stopped by the engagement of its end 37 with the tongue 28.

As the end 37 engages the plates 6 and 8 at positions just back from the mouth 10 it forces the plate 6 to tilt in an anticlockwise (as seen in FIG. 2) sense about the axis X, against the spring action of the bights 14, and also forces the plate 8 slightly away from the plate 6. When the end 37 of element 4 has passed the axis X and the dimple 26, the plate 6 is tilted by the element 4 in the opposite sense, i.e. clockwise, about the axis X, also against the spring action of the bights 4 and the part of the lower plate 8 between the dimple 26 and the mouth 10, is forced towards, and against, the element 4 by virtue of the spring action of the bights 14 and of its engagement with the dimple 26, about an axis X1. The plates 6 and 8 are accordingly brought into substantial parallelism as shown in FIG. 3 so that the element 4 is gripped between the plates 6 and 8 in the vicinity of the mouth 10 and also at the dimple 26 which is remote from the mouth 10 in the insertion direction of the element 4. Until the end 37 passes the axis X, the force required to insert the element 4 is low and then rises substantially, the final contact pressure between the plates 6 and 8 and the element 4, being high.

When the element 4 has been fully inserted into the passage 12, to a depth which is predetermined by the position of the tongue 28, the dimple 26 makes firm electrical contact with the pad 36 of the element 4, and lower plate 8 also firmly engages the resistive tile 38 at 39 (in FIG. 3) near the mouth 10 so that the receptacle 2 assists in dissipating heat generated by current passed through the tile 38, when the element 4 is in use.

According to the modification shown in FIGS. 4 and 5, the dimple 26 is omitted, the lower plate, 8A, being planar throughout the length of the passage 12. The remaining parts shown in FIGS. 4 and 5 are as referenced in FIGS. 1 to 3. As the element 4 is inserted, the plate 6 is tilted in the manner described above, the plate 8A being first tilted slightly, against the spring action of the bights 14, in a clockwise (as seen in FIG. 4) sense about an axis X2 at its junction with the extension plate 30, that is to say at a position remote from the mouth 10, in the insertion direction, and is then returned by said spring action to be pressed against the adjacent lower face of the element 4 as the end 37 thereof is advanced between the axis X and the tongue 28. The plate 8A thus engages the element 4 throughout the length of the plate 8A, whereby the element 4 is gripped between the plates 6 and 8A throughout the inserted length of the element 4, to provide area contact between the plate 8A, and the pad 36 and tile 38.

I claim:

1. An electrical receptacle for mating with a male electrical element and comprising first and second superposed plates cooperating to define a flared mouth and a passage communicating with the mouth, the plates being joined together by resilient bights on opposite sides of the mouth; wherein the plates converge in a direction away from the mouth so that the passage tapers in height away therefrom, the first plate being connected to the bights at positions spaced back from the mouth, and thus projecting freely between the bights so as to be tiltable about its connections therewith by a male electrical element inserted into the passage by way of the mouth, to cause the male element to be gripped between the plates at least in the vicinity of the mouth and at a position remote therefrom, when the leading end of the male element has reached a predetermined position beyond said connections.

2. A receptacle as claimed in claim 1, wherein the second plate is joined to the bights at positions proximate to the mouth and is provided with an extension projecting beyond the first plate, in the insertion direction of the male element.

3. A receptacle as claimed in claim 1, wherein the passage is locally constricted in the vicinity of said connections.

4. A receptacle as claimed in claim 3, wherein the passage is constricted by means of a dimple formed in the second plate and projecting into the passage.

5. A receptacle as claimed in claim 1, wherein the extent to which the male element can be inserted into the passage is limited by a stop located at said predetermined position.

6. A receptacle as claimed in claim 5, wherein the stop is in the form of a tongue stuck from one of the plates and normally projecting into an opening in the other plate.

7. A receptacle as claimed in claim 1, wherein the plates are in at least substantially parallel relationship when the leading end of the male element has reached said predetermined position.

8. A receptacle as claimed in claim 1, wherein the bights are arranged in axial alignment.

9. A receptacle as claimed in claim 1, in combination with the male element, wherein said male element is of constant cross-section, the thickness of the male element being slightly less than the maximum height of the passage prior to the insertion of the male element into the mouth.

* * * * *

UNITED STATES PATENT OFFICE
CERTIFICATE OF CORRECTION

Patent No. 4,669,808              Dated   June 2, 1987

Inventor(s)   Leonard John Owen

It is certified that error appears in the above-identified patent and that said Letters Patent are hereby corrected as shown below:

On the cover page, item (45), delete "1986" and insert --- 1987 ---.

In claim 6, line 38, delete "stuck" and insert --- struck ---.

Signed and Sealed this

Thirteenth Day of October, 1987

Attest:

DONALD J. QUIGG

Attesting Officer           Commissioner of Patents and Trademarks